United States Patent
Chattha et al.

(10) Patent No.: US 6,537,511 B1
(45) Date of Patent: Mar. 25, 2003

(54) MODIFIED PLATINUM $NO_x$ TRAP FOR AUTOMOTIVE EMISSION REDUCTION

(75) Inventors: Mohinder Singh Chattha, Northville, MI (US); Jun (John) Li, Canton, MI (US); William Lewis Henderson Watkins, Toledo, OH (US); Amy Berris, Berkley, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 34 days.

(21) Appl. No.: 09/643,310

(22) Filed: Aug. 21, 2000

(51) Int. Cl.$^7$ ............................................. C01B 21/20
(52) U.S. Cl. ................................... 423/213.5; 502/328
(58) Field of Search ........................ 423/213.5; 502/304, 502/202, 328, 330; 60/295, 302

(56) References Cited

U.S. PATENT DOCUMENTS

| | | | |
|---|---|---|---|
| 4,749,671 A | | 6/1988 | Saito et al. |
| 4,906,176 A | * | 3/1990 | Yamashita et al. ............. 431/7 |
| 4,977,129 A | | 12/1990 | Ernest |
| 5,049,364 A | | 9/1991 | Yoshimoto et al. |
| 5,665,322 A | | 9/1997 | Kiyohide et al. |
| 5,747,410 A | * | 5/1998 | Muramatsu et al. ..... 423/213.2 |
| 5,879,645 A | | 3/1999 | Park et al. |
| 5,922,293 A | | 7/1999 | Miyoshi et al. |
| 5,922,295 A | * | 7/1999 | Chattha et al. ............. 422/171 |
| 5,950,421 A | | 9/1999 | Chattha et al. |
| 5,968,462 A | | 10/1999 | Suzuki |
| 6,010,673 A | | 1/2000 | Kanazawa et al. |
| 6,161,378 A | * | 12/2000 | Hanaoka et al. ............. 422/177 |

* cited by examiner

Primary Examiner—Stanley S. Silverman
Assistant Examiner—Edward M. Johnson
(74) Attorney, Agent, or Firm—Damian Porcari

(57) ABSTRACT

The invention is a method of treating exhaust gases generated by an internal combustion engine using a $NO_x$ trap in the exhaust flow system. The method comprises locating a nitrogen oxide trap in the exhaust gas passage and cycling the air/fuel ratio of the exhaust gases entering the trap between lean and rich, such that the trap absorbs nitrogen oxides during the lean cycle and desorbs the nitrogen oxides when the concentration of the oxygen in the exhaust flow is lowered as during a rich cycle. The trap comprises: (a) a porous support material comprising mostly γ-alumina; (b) a sulfur-suppressing metal selected from the group consisting of cesium, zinc and a combination of cesium and zinc; (c) a precious metal; and (d) a $NO_x$ sorption metal such as barium, the metals being deposited in the support material, the amount of the metals being individually dependent on the weight of the support material. The desorbed nitrogen oxides may be converted over the precious metal to $N_2$ by reductants like hydrogen, hydrocarbon and carbon monoxide present in the exhaust gas.

13 Claims, 1 Drawing Sheet

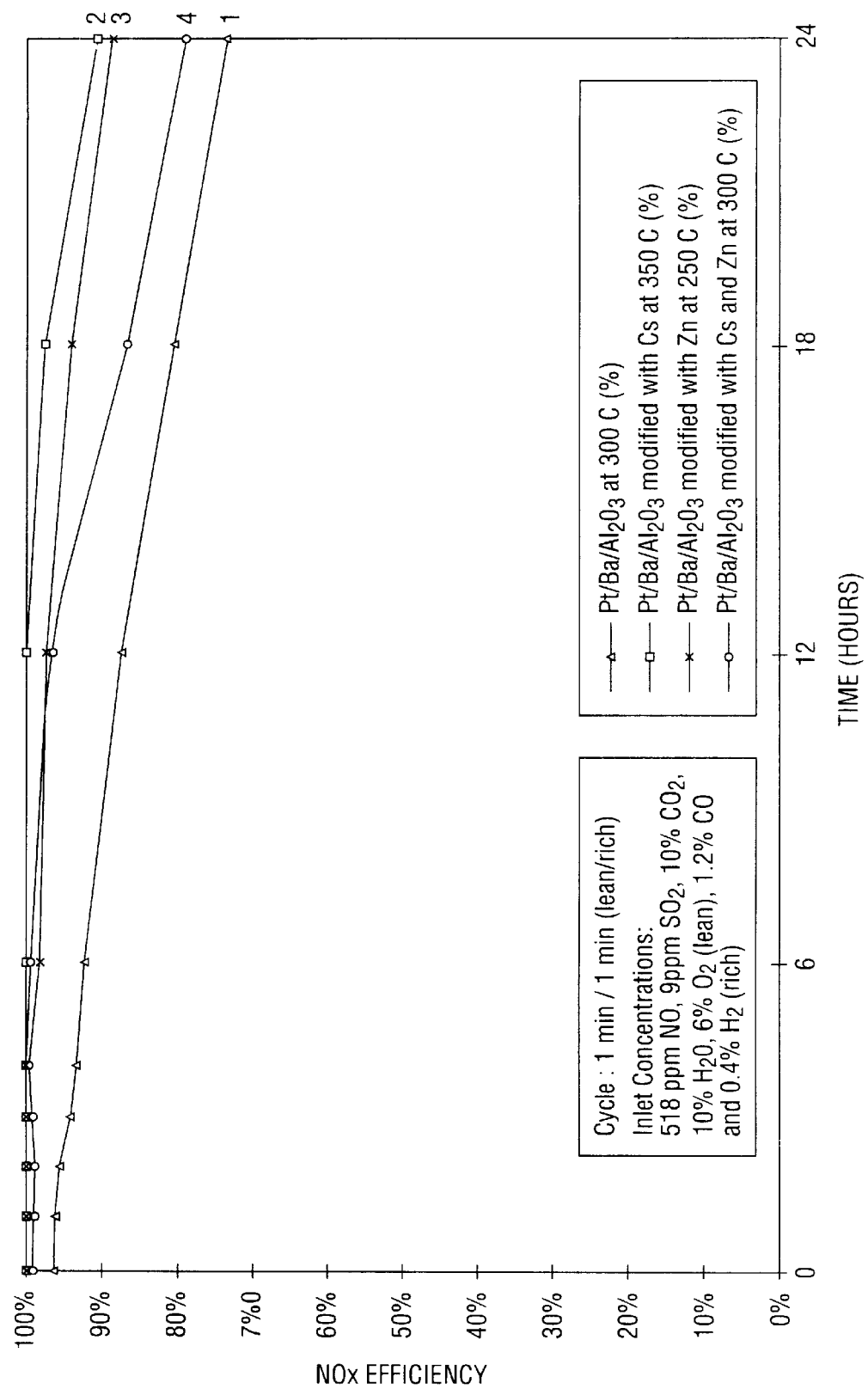

MODIFIED PLATINUM NO$_x$ TRAP FOR AUTOMOTIVE EMISSION REDUCTION

TECHNICAL FIELD

This invention relates to a method of using a nitrogen oxide trap comprising platinum, barium, and incorporating cesium, zinc and/or a combination of cesium and zinc to absorb nitrogen oxides during lean-burn operation, release the nitrogen oxides when the oxygen concentration in the exhaust gas is lowered and provide a NO$_x$ trap with significantly increased sulfur poisoning resistance.

BACKGROUND ART

Catalysts are employed in the exhaust systems of automotive vehicles to convert carbon monoxide, hydrocarbons, and nitrogen oxides (NO$_x$) produced during engine operation into more desirable gases. When the engine is operated in a stoichiometric or slightly rich air/fuel ratio, i.e., between about 14.7 and 14.4, catalysts containing precious metals, such as palladium and rhodium, are able to efficiently convert all three gases simultaneously. Hence, such catalysts are often referred to as "three-way" catalysts.

It is desirable, however, to operate gasoline engines under "lean-burn" conditions where the A/F ratio is greater than 14.7, generally between 19 and 30, to realize a benefit in fuel economy. Such three-way catalysts are able to convert carbon monoxide and hydrocarbons but are not efficient in the reduction of NO$_x$ during lean-burn (excess oxygen) operation. Efforts have been made in developing lean-burn catalysts in recent years. One deficiency of some of the conventional lean-burn catalysts is that they are based on zeolite materials which are less than durable at the elevated temperatures necessary for their efficient catalytic operation in the exhaust gas system. Lean-burn catalysts act to reduce NO$_x$ through the use of hydrogen, hydrocarbons and carbon monoxide over a catalyst.

Recent efforts to solve the problem of NO$_x$ in lean-burn systems have focused on lean-NO$_x$ traps, i.e., materials which are able to absorb nitrogen oxides during lean-burn operation and are able to release them when an oxygen concentration in the exhaust gas is lowered. Hence, these traps are used with engine systems which operate primarily in a lean air/fuel ratio, but then when it is desired to purge the traps of NO$_x$, the exhaust entering the trap is made richer, particularly rich of stoichiometric conditions. Typical catalyst materials used in conventional traps are alkaline earth metals like barium combined with a precious metal catalyst like platinum. European Patent Application No. 0613714 A2, published Sep. 7, 1994, discloses that platinum or palladium in various combinations with at least two ingredient materials of the alkali metals, alkaline earth metals, transition metals, or rare-earth metals are capable of storing or absorbing nitrogen oxides under exhaust conditions of excess oxygen and desorbing the NO$_x$ during stoichiometric or fuel-rich atmospheres. When the NO$_x$ is purged, it is expected that the NO$_x$ is reduced over the precious metal to nitrogen and oxygen containing species such as carbon dioxide and water.

The widely held mechanism for this absorption phenomena is that during the lean-burn operation the platinum first oxidizes NO to NO$_2$ and the NO$_2$ subsequently forms a nitrate complex with the other material, e.g., the barium. In the regeneration mode as during a stoichiometric or rich environment, the nitrate is thermodynamically unstable, and the stored NO$_x$ is released. NO$_x$ then catalytically reacts over the platinum with reducing species in the exhaust gas like HC, CO and hydrogen to form N$_2$ and CO$_2$ and H$_2$O. According to one strategy for using lean-NO$_x$ traps, a hybrid-mode engine strategy is used to cycle the air/fuel ratio between extended periods of lean operations where the traps sorb NO$_x$ emissions, alternated with brief, fuel-rich intervals to desorb the adsorbed NO$_x$ and regenerate the lean-NO$_x$ trap. U.S. Pat. No. 5,473,887 discloses such operation of an exhaust purification device, the teachings of which are hereby expressly incorporated by reference herein.

The alkali metal and alkaline earth metals which are typically utilized for NO$_x$ sorption have, however, the serious drawback that they are readily poisoned by sulfur in the exhaust gas. Most fuels for automotive vehicles contain sulfur and when burnt, the sulfur is converted to sulfur compounds like SO$_2$. Over time, the sulfur compounds react with these alkali metal or alkaline earth trap materials forming sulfates which will not revert back to the sorption material. The available sites for NO$_x$ sorption and desorption are reduced and NO$_x$ conversion efficiencies are reduced. As a result, the typical NO$_x$ trap material which uses precious metal and an alkaline earth, such as barium, is strongly deactivated by sulfur in the fuel.

According to the present invention, we have now found that the incorporation of cesium and zinc into the platinum/barium oxide/alumina trap provides significantly increased sulfur poisoning resistance.

DISCLOSURE OF INVENTION

This invention is directed to a method for treating exhaust gas emissions which comprises locating a NO$_x$ trap material in an exhaust gas passage of an internal combustion engine, exposing the trap material to engine exhaust gases having a lean of stoichiometric air/fuel ratio whereby the trap material absorbs nitrogen oxides from the exhaust gas; monitoring the amount of absorbed nitrogen oxides in the trap; and purging the absorbed nitrogen oxides by subjecting the nitrogen oxide trap to engine exhaust gases whose air/fuel ratio is stoichiometric or rich of stoichiometry. The NO$_x$ trap material comprises: (a) porous support material comprising mostly γ-alumina; and (b) metals consisting essentially of 1–5 wt % of (i) a sulfur-suppressing metal such as cesium, zinc or a combination of cesium and zinc, (ii) a precious metal such as platinum, and (iii) a NO$_x$ sorption metal selected from the alkali metals (Group 1A), alkaline earth metals (Group IIA), and light rare earth metals such as cerium and praseodymium, the amount of the metals being individually based on the weight of the support material. The trap may include other precious metals like rhodium or palladium. Preferably, the support material is γ-alumina, and platinum, barium oxide and the sulfur-suppressing metal are loaded on the support sequentially with the sulfur-suppressing metal being loaded after the platinum and barium.

Advantageously, we have found that the incorporation of cesium and/or zinc into the NO$_x$ trap provides significantly increased sulfur poisoning resistance. It is believed that the interaction between platinum and these metal oxides suppresses the oxidation of sulfur dioxide over the precious metal, promoting the desorption of sulfur containing compounds, i.e., sulfites and sulfates, and resulting in improved NO$_x$ trap sulfur tolerance. This allows for improved traps as compared to the prior art conventional traps.

BRIEF DESCRIPTION OF DRAWINGS

FIGURE is a graph showing the reduced effect of sulfur poisoning to a 150 ppm fuel sulfur level over a 24-hour poisoning interval. Curve 1 illustrates the conventional $NO_x$ traps while curves 2, 3 and 4 illustrate the 10–15% trapping efficiency improvement resulting from the present invention.

BEST MODE FOR CARRYING OUT THE INVENTION

The invention method comprises a method for preparing a nitrogen oxide trap with improved sulfur tolerance for use in treating exhaust gases from an internal combustion engine and a method for treating exhaust gases from an internal combustion engine using a nitrogen oxide trap with improved sulfur tolerance. This method comprises locating a cesium/zinc-platinum-barium on alumina material in the exhaust gas passage of an internal combustion engine and subjecting the material to cyclic air/fuel ratios from lean to rich as disclosed above. In particular, the nitrogen oxide trap is contacted with engine exhaust gases having a lean air/fuel ratio whereby the trap absorbs nitrogen oxides from the exhaust gas. The amount of nitrogen oxides absorbed in the trap is monitored. This can be done by monitoring the concentration of the nitrogen oxides in the exhaust gas entering and leaving the trap and watching for an increase in the concentration (nitrogen oxide breakthrough), or using estimating means such as torque/load measurements of the engine. Still other ways to determine the amount of nitrogen oxide absorbed in the trap, and consequently the available absorbent ability of the trap material, will be apparent to those skilled in the art.

When the trap has reached a predetermined saturation of absorbed nitrogen oxide, it is subjected to a nitrogen oxide purge by passing exhaust gases whose air/fuel ratio is preferably rich of stoichiometric. It should be noted that nitrogen oxide is converted to nitrogen during the purging step. This may be accomplished by switching the engine to rich air/fuel operating mode or providing an increased concentration of, e.g., hydrocarbons into the gases entering the trap, such as by providing supplemental fuel or other hydrocarbons. Still other ways to increase the air/fuel ratio of the exhaust gas in the trap for purging will be apparent to those skilled in the art in view of the present disclosure. After the trap has been purged of nitrogen oxide, either partially or fully, the trap is again subjected to lean engine operation whereby the trap will absorb the nitrogen oxides from the exhaust gas. And so the absorbed/purged cycling will be repeated.

The nitrogen oxide trap material comprises metals which consist of a sulfur-suppressing metal selected from the group consisting of cesium, zinc and/or a combination of cesium and zinc, a precious metal selected from the group consisting of platinum, palladium and rhodium and $NO_x$ sorption metals, i.e., alkali metals, alkaline earth metals or light rare earth metals such as cerium and praseodymium loaded on a mostly γ-alumina porous support material (herein termed "γ-alumina support material").

By "mostly γ-alumina" is meant that the support material comprises more than 50% by weight of this alumina. More preferably, this alumina is greater than 80%. The most preferred $NO_x$ sorption metal is barium. The most preferred precious metal is platinum. In addition to the γ-alumina, however, if desired, the γ-alumina support material may include very small amounts of other materials often included to stabilize the alumina or provide oxygen storage properties like cerium oxide, barium oxide, zirconium oxide, lanthanum oxide, titanium oxide, silica, and alpha-alumina. This support material comprising mostly γ-alumina is desired because it has high surface area and good adhesion.

The sulfur-suppressing metal, $NO_x$ sorption metal and precious metals may be loaded onto the γ-alumina support material in any manner, several methods for providing metals on support materials being well known in the art. One particularly convenient method is by impregnating the γ-alumina support material with an aqueous or organic solvent solution comprising a soluble compound of the metal. Exemplary of such solvents are water, solution of alkalis like ethanol, toluene, isopropyl alcohol, acetone, methyltheylketone, butylacetate, and dimethylformamide. Exemplary of such soluble sulfur-suppressing metal compounds are cesium chlorides, cesium nitrates, cesium sulfates, and cesium ammonia. Particularly preferred is cesium nitrate. Similarly, if zinc is used as the sulfur-suppressing metal then such soluble compounds as zinc chlorides, zinc nitrates, zinc sulfates and zinc ammonia may be utilized. In the same way, soluble platinum containing compounds may be employed to provide platinum on the support. For example, compounds like chloroplatinic acid, amino-Pt-nitrates like tetramine platinum nitrate and Pt-carboxylates are useful. Solvents which may be useful include water and methanol water being preferred. For the $NO_x$ sorption metals, soluble compounds of the $NO_x$ sorption metals may be used for impregnation. Most preferably, soluble barium containing compounds may be employed to provide barium on the support. For example, compounds like barium chloride, barium nitrate, barium sulfate, and barium ammonia. Particularly preferred is barium nitrate. Other such materials which may be used would be apparent to those skilled in the art in view of the present disclosure.

Any soluble sulfur-suppressing metal and platinum compound which is soluble in an aqueous or organic medium, and whose functional group is capable of being decomposed by heat to leave only the sulfur-suppressing metal or its oxide and the precious metal or its oxide on the support material may be employed in this impregnation technique. Hence, such a compound is called a catalyst precursor compound. Other sulfur-suppressing metal and platinum precursor compounds useful in this invention in addition to those listed above will be apparent to those skilled in the art in view of the present disclosure. In addition to the precious metal platinum, other precious metals like palladium and more preferably rhodium may also be deposited with the platinum on the porous support from precursor compounds therefor. Rhodium is particularly useful since it enhances the conversion of nitrogen oxide to nitrogen and carbon dioxide and water during purging of the $NO_x$ trap materials.

According to the method of impregnation disclosed above, the "catalyst precursor compound" (exemplary of the sulfur-suppressing metal and precious metal compounds) is dissolved generally by simply mixing the compound into an aqueous or organic solvent to make the catalyst precursor solution thereof. A solution of the catalyst compound is generally further diluted for impregnation of the support. The catalyst precursor solution may also comprise a mixture of compatible organic solvent and/or catalyst compounds.

For useful application in an exhaust system, the washcoat will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the catalyst of this invention. It is preferred that the surface area of the monolithic structure provide 50–1000 meters square per liter structure, as measured by $N_2$ adsorption. Cell density should be maximized consistent with pressure drop limitations and is preferably in the rate of 200–900 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the support material may be applied to the substrate and then impregnated with the precursor catalyst solution. Alternatively, the impregnated washcoat may be applied to the substrate. Generally, the washcoat (support material) is provided first on the substrate. Still other ways of providing the catalyst product will be apparent to those skilled in the art in view of the present disclosure, the method not being critical to the present invention. Preferably, a platinum impregnated washcoat is made into a slurry and the monolith is coated with it. After drying the monolith, a barium impregnated washcoat is made into a slurry and coated on the platinum washcoat. Once again, after drying the monolith, a sulfur-suppressing metal impregnated washcoat is made into a slurry and deposited on the barium/platinum washcoat. For an exhaust system this impregnated washcoat is generally subjected to elevated temperatures to decompose and eliminate the functional group of the catalyst precursor. It may be further subjected to calcining. Optimally, the substrate carries a washcoat (alumina support impregnated with platinum/barium, sulfur-suppressing metal) in an amount of between 25 and 35 by weight based on the weight of the substrate.

If the heating is carried out in air, the sulfur-suppressing metal compound decomposes and forms cesium oxide, zinc oxide and/or a combination of cesium and zinc oxide. If, on the other hand, the heating is carried out in a reducing atmosphere, the sulfur-suppressing metal compound may be reduced to elemental cesium, zinc and/or a combination of cesium and zinc. When the catalyst is placed in use, oxygen present in the exhaust gas will oxidize the sulfur-suppressing metal to its oxide. In the case of platinum, it is oxidized to platinum oxide which at high temperatures decomposes to platinum and oxygen. Thus it often exists as a mixture of platinum and its oxides. Similarly, the barium is oxidized to barium oxide which at high temperatures decomposes to barium and oxygen.

The support material is loaded such that the amount of sulfur-suppressing metal oxide is between 1–20% and the amount of precious metals, such as platinum is between 0.5–5 wt %, preferably about 2 wt %, each based on the weight of the support. For the sulfur-suppressing metal, if cesium is used alone the preferred loading is from 1–10 wt %. If zinc is used alone the preferred loading is 0.5–10 wt %. The combination of zinc and cesium would have a loading of between 1–20 wt %. It should be noted that it is possible to avoid the use of barium on the support material if the sulfur-suppressing metal consists only of cesium. However, where the support material includes some quantity of zinc, the use of barium is preferred to provide $NO_x$ storage. The amount of barium is preferably between 1–20 wt % based on the weight of the support. Other precious metals may be included with the platinum, preferably rhodium, as disclosed above. A combination of platinum/rhodium may also be used, preferably at a ratio of 5:1.

For testing of the present invention, a granular support is mixed with the catalyst precursor solution and stirred at an elevated temperature generally of about 75–120° C. to evaporate the solvent. The impregnated support material is then heated to decompose and eliminate the functional group from the mixture, such as by heating at 320° C. for one hour and thereafter for four hours at 600° C. The sulfur-suppressing metal, barium and platinum may be impregnated into the washcoat support from a single solution or in sequence, either being impregnated first. It may also involve multiple impregnations. In the most preferred embodiment, platinum is impregnated first into the washcoat support, followed by barium and then followed by the sulfur-suppressing metal.

As disclosed above, according to another aspect of the invention, it comprises an exhaust gas treatment system comprising the $NO_x$ trap disclosed herein dispersed in the exhaust gas passage of a gasoline internal combustion engine. The exhaust gas treatment system of this invention may include another catalyst device as, for example, a catalytic converter employing a conventional three-way catalyst containing palladium, etc., or a lean-burn catalyst such as one containing transition metals like silver, copper, etc. These catalysts, e.g., the three-way catalyst, can be placed upstream of the $NO_x$ trap, hence closer to the engine. In such an arrangement, the three-way catalyst being preferably closely mounted to the engine would warm up quickly and provide for efficient engine cooled start emission control. The $NO_x$ trap would be positioned downstream of the three-way catalyst where the lower exhaust gas temperature enables maximum $NO_x$ trap efficiency. Also, with the $NO_x$ trap positioned downstream of the three-way catalyst in a remote location, it is protected against very high exhaust gas temperatures which could damage it.

As discussed above, during periods of lean-burn engine operation when $NO_x$ passes through the three-way catalyst, $NO_x$ is stored on the trap. The $NO_x$ trap is periodically regenerated by short periods or intervals of slightly rich engine operation. Thus, the stored $NO_x$ is then released (purged) from the trapping material and is catalytically reduced over the precious metal-like platinum in the trap by the excess hydrocarbons and other reductants like CO and $H_2$ present in the exhaust gas. In general, the released $NO_x$ is efficiently converted to $N_2$ and $CO_2$ and $H_2O$, which efficiency is enhanced when rhodium is contained within the $NO_x$ trap washcoat. However, one may wish to place a second three-way catalyst downstream of the $NO_x$ trap in order to further aid in this regard. As disclosed above, the invention $NO_x$ traps to be used for gasoline engines were during the lean-burn portion where the air/fuel ratio is usually in the range of 19–30.

The Figure illustrates the reduced effective sulfur poisoning equivalent to a 150 ppm fuel sulfur level over a 24 hour poisoning interval. The Figure includes four curves generated on the basis of test results for four different catalyst compositions, set forth below in examples 1–4. In each case the testing time period was 24 hours and the test was designed to determine the $NO_x$ efficiency of the four different catalyst compositions. For this test, the following inlet concentrations were used to generate $NO_x$ efficiency: 1) 518 ppm NO; 2) 9 ppm $SO_2$; 3) 10% $CO_2$; 4) 10% $H_2O$; 5) 6% $O_2$ (lean); 6) 1.2% CO & 0.4% $H_2$ (rich).

EXAMPLE 1

Curve 1 of the figure depicts the result of a Pt/Ba/alumina catalyst at 300° C. over a 24 hour interval—a catalyst without the sulfur-suppressing metals disclosed in this invention.

This Pt/Ba/alumina catalyst was prepared in the following manner: Cordierite substrate is washcoated with $Al_2O_3$ from a water soluble source of Al such as the nitrate salt and deposited to 2.2 g/in³ (30–35 wt %); dried at 80° C. for 6 hr. and heat treated at 600° C. for 6 hr. in air. Pt from the soluble chloride salt is deposited as 2.0 metal wt % of $Al_2O_3$ deposited from an aqueous solution, dried at 80° C. for 6 hr. and heat treated at 600° C. for 6 hr. in air. 12 wt % BaO, from aqueous $Ba(NO_3)_2$ or BaO is deposited as wt % of $Al_2O_3$ and fixed on the $Al_2O_3$ as in the two previous steps.

EXAMPLE 2

Curve 2 was generated from a $Pt/Ba/Al_2O_3$ modified with cesium catalyst at 350° C.—the preparation of $Pt/Ba/Al_2O_3$ is to be handled as set forth in Example 1. Cesium from $CsNO_3$ was deposited at 3 wt %, deposited from an aqueous solution, dried at 80° C. for 6 hr. and heat treated at 600° C. for 6 hr. in air.

EXAMPLE 3

Curve 3 was generated with a $Pt/Ba/Al_2O_3$ modified with zinc catalyst at 250° C.—the preparation of $Pt/Ba/Al_2O_3$ is to be handled as set forth in Example 1. Zinc from a $Zn(NO_3)_2$ solution, with zinc at 3 wt %, was deposited on the $Al_2O_3$ support, dried at 80° C. for 6 hr. and heat treated at 600° C. for 6 hr. in air.

EXAMPLE 4

Curve 4 was likewise generated with a Pt/Ba/alumina catalyst modified with cesium and zinc at 300° C.—the preparation of $Pt/Ba/Al_2O_3$ is to be handled as set forth in Example 1. The nitrates of cesium, $CsNO_3$, and zinc, $Zn(NO_3)_2$ were combined, each having a metal wt % of 1.5—so that the catalyst composition ultimately included 1.5 wt % cesium and 1.5 wt % zinc. The nitrates of zinc and cesium are combined together with one aqueous solution for deposition and heat treated, as in Examples 1–3.

Curves 2, 3 and 4 of the Figure show a 10–15% trapping efficiency improvement over Curve 1 which excludes the sulfur-suppressing metals disclosed in this invention. Clearly, curves 2, 3 and 4 illustrate the significantly improved $NO_x$ trapping efficiency which results from the present invention.

While the best mode for carrying out the invention has been described in detail, those familiar with the art to which this invention relates will recognize various alternative designs and embodiments for practicing the invention as defined by the following claims.

What is claimed is:

1. A method for improving the sulfur tolerance of a nitrogen oxide trap used to treat exhaust gases from an internal combustion engine having an exhaust gas passage, said method comprising the steps of:
    locating in the exhaust gas passage of the internal combustion engine a nitrogen oxide trap material comprising:
        (a) a porous support material comprising mostly γ-alumina;
        (b) metals consisting essentially of (1) 0.5 to 5 wt % precious metal selected from the group consisting of platinum, palladium and rhodium, the precious metal being deposited -on the support material, (2) 1–20 wt % $NO_x$ sorption metal selected from the group consisting of alkali metals, alkaline earth metals, cerium and praseodymium, and (3) 1–20 wt % of a sulfur-suppressing metal selected from the group consisting of cesium, zinc, and mixtures thereof, the amount of the metals being individually based on the weight of the support material;
    exposing the nitrogen oxide trap to engine exhaust gases having a lean of stoichiometric air/fuel ratio whereby the trap absorbs nitrogen oxides from the exhaust gas; and
    purging the absorbed nitrogen oxide from the trap by subjecting the nitrogen oxide trap to engine exhaust gases whose air/fuel ratio is stoichiometric or rich of stoichiometry.

2. The method of claim 1 wherein the sulfur-suppressing metal comprises about 1–10 wt % and the platinum comprises about 1.5–2.5 wt %.

3. The method of claim 1 wherein the support material consists of γ-alumina.

4. The method of claim 1 wherein the support material further comprises materials selected from the group consisting of cerium oxide, zirconium oxide, lanthanum oxide, titanium oxide and γ-alumina.

5. The method of claim 1 which further comprises loading a three-way catalyst or a lean nitrogen oxide catalyst upstream of the nitrogen oxide trap.

6. The method of claim 1 which further comprises loading a three-way catalyst downstream of the nitrogen oxide trap.

7. The method of claim 1 wherein the support material loaded with a precious metal, $NO_x$ sorption metal and a sulfur-suppressing metal is carried on a substrate.

8. The method of claim 7 wherein the substrate is selected from the group consisting of cordierite, metal and ceramic honeycomb materials.

9. The method of claim 7 wherein the substrate carries about 25–35 wt % alumina support loaded with a precious metal, $NO_x$ sorption metal and a sulfur-suppressing metal, the wt % is based on the weight of the substrate.

10. The method of claim 9 wherein the precious metal is platinum and the $NO_x$ sorption metal is barium.

11. The method of claim 10 wherein the locating step comprises first forming the nitrogen oxide trap material by impregnating the support material with a solution of the platinum/barium/sulfur-suppressing metals, either individually or together, and subsequently drying the material to remove the solvent.

12. The method of claim 10 wherein rhodium, palladium, or their mixture is also deposited on the support material with the platinum.

13. The method for improving the sulfur tolerance of a nitrogen oxide trap used to treat exhaust gases from an internal combustion engine having an exhaust gas passage, said method comprising the steps of:
    locating in the exhaust gas passage of the internal combustion engine a nitrogen oxide trap material comprising:
        (a) a porous support material comprising mostly γ-alumina;
        (b) metals consisting essentially of (1) 0.5 to 5 wt % precious metal selected from the group consisting of platinum, palladium and rhodium, the precious metal being deposited on the support material and (2) 1–10 wt % cesium, the amount of the metals being individually based on the weight of the support material;
    exposing the nitrogen oxide trap to engine exhaust gases having a lean of stoichiometric air/fuel ratio whereby the trap absorbs nitrogen oxides from the exhaust gas; and
    purging the absorbed nitrogen oxide from the trap by subjecting the nitrogen oxide traps to engine exhaust gases whose air/fuel ratio is stoichiometric or rich of stoichiometry.

* * * * *